BEST AVAILABLE COPY

April 1, 1941. A. J. THOMSON Re. 21,760

CIRCUIT BREAKER

Original Filed March 6, 1933 2 Sheets-Sheet 1

INVENTOR.

BY Alfred J. Thomson

Daniel G. Cullen

BEST AVAILABLE COPY

April 1, 1941. A. J. THOMSON Re. 21,760

CIRCUIT BREAKER

Original Filed March 6, 1933 2 Sheets-Sheet 2

INVENTOR.
Alfred J. Thomson
BY
David G. Cullen.

Reissued Apr. 1, 1941 BEST AVAILABLE COPY Re. 21,760

UNITED STATES PATENT OFFICE 21,760

CIRCUIT BREAKER

Alfred J. Thomson, Detroit, Mich., assignor to Bulldog Electric Products Company, Detroit, Mich., a corporation of West Virginia Original No. 2,102,295, dated December 14, 1937, Serial No. 659,714, March 6, 1933. Renewed January 11, 1937. Application for reissue September 9, 1940, Serial No. 356,071

10 Claims. (Cl. 200—116)

This invention relates to operating mechanisms for circuit breakers.

Herein disclosed is a novel operating mechanism, the provision of which is a principal object of the invention.

Among the characteristics of the mechanism disclosed in the drawings, are the following:

(1) The mechanism is trip free; that is to say, upon release of the mechanism parts by the overload release element, the mechanism parts will trip and move to their overload released position, even though the handle, which normally operates the mechanism, is held against movement intentionally or accidentally; the mechanism parts trip for overload release, free of the handle.

(2) The mechanism is so constructed as to have quick action on normal operation, and on overload release, and these actions are accomplished even though a relatively small number of parts are used in the mechanism.

(3) The connection between the operating handle and the mechanism parts, though permitting quick action, is positive, so that even though the springs which provide the quick action should become injured, or prove insufficient to cause action, or so that even though the mechanism sticks, action can be accomplished positively by movement of the handle.

(4) The operating springs are in the nature of compression springs, which is of advantage, due to the fact that compression springs are more satisfactory of operation than other forms of springs.

(5) Further, the compression springs are mounted on links so that in the event a spring breaks, the broken parts will not fall into and among live parts, with consequent damage.

(6) Further, the operating compression springs are so positioned and connected that they need be flexed only a relatively small distance, as contrasted with other mechanisms, wherein considerable flexing of the springs is required, it being observed that lessening of the required spring-flexing has the effect of prolonging the life of the springs.

(7) Further, the springs are not connected to the operating handles, and therefore, the handles can be moved, for positive action, independently of the springs.

(8) Further, reset action, after overload "off" tripping, can be accomplished without the operating arm or link of the mechanism moving out of "off" position.

Still further objects will readily occur to those skilled in the art upon reference to the following description and the accompanying drawings in which—

*The device of Figures 1–5*

Figure 4:
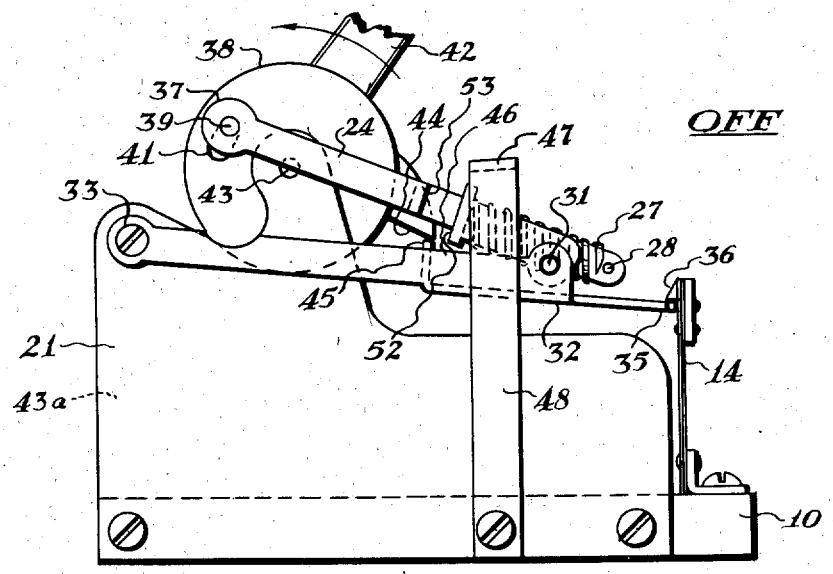
Figs. 4 and 5 show the device in "off" position and overload "off" position, respectively.
Figure 5:
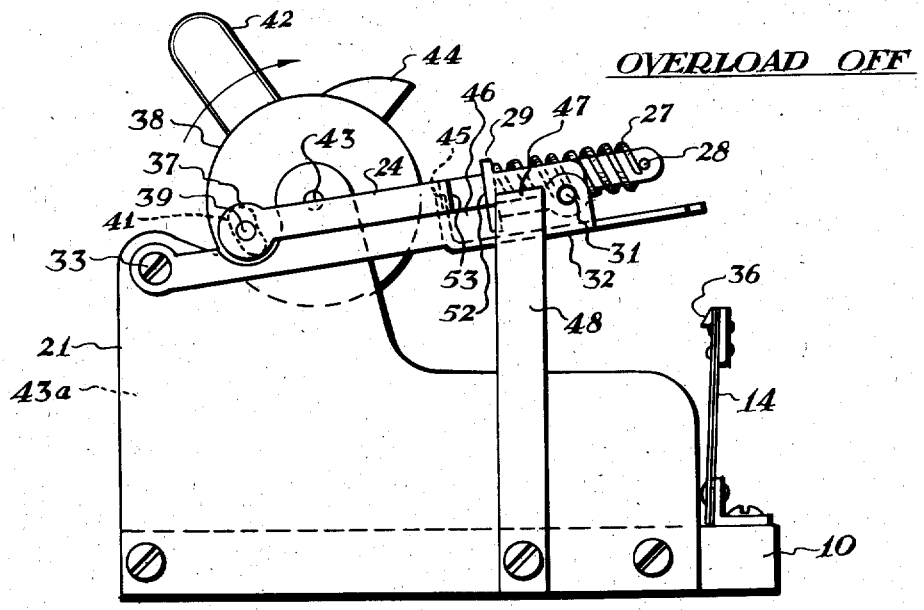

In Figures 1 to 5 there is shown a circuit breaker operating mechanism having three positions, "on" (Fig. 2), switch "off" (Fig. 4) and overload "off" (Fig. 5).

The device includes a base 10. To the line is connected one leg of the thermostatic or bimetallic warping element 14, the other leg of the latter being connected to the load. When the mechanism is in "on" position, current flows through warping element 14.

A coiled compression resisting spring 27 is mounted on the right hand end of link 24, between a pin 28 thereon and the bight of a U-shaped, horizontally positioned spring compression link 29, which is pivotally connected at 31 to a pawl 32, the latter being pivotally connected by shouldered screws 33 on its left hand end to front plate 21 and vertical back plate 43a. As indicated, the link 24 passes through a slot in the bight of link 29, and these links move as a unit, around pivot 31. In the "on" position, the right hand or free end 35 of pawl 32 is held down by a tongue 36 of warping element 14.

The left hand end 37 of link 24 is pivotally connected to an operating bell crank 38 by a pin 39, the latter sliding in an arcuate slot 41 of the crank. The bell crank has an extension 42 forming an operating handle for the device, and is pivotally supported on the cross shaft 43, the latter connecting front plate 21 and the vertical back plate 43a.

Figure 1:
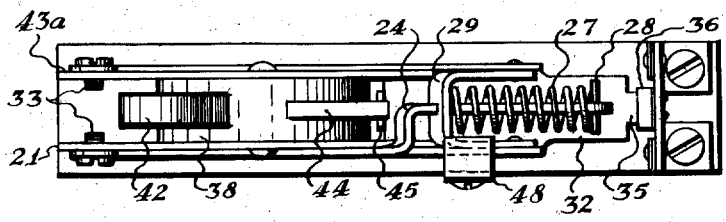
Figs. 1–3 are plan, elevation, and end views, respectively of an operating mechanism for a circuit breaker, shown in "on" position.
Figure 3:
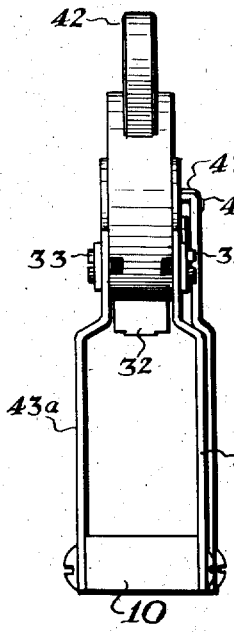
Figure 2:
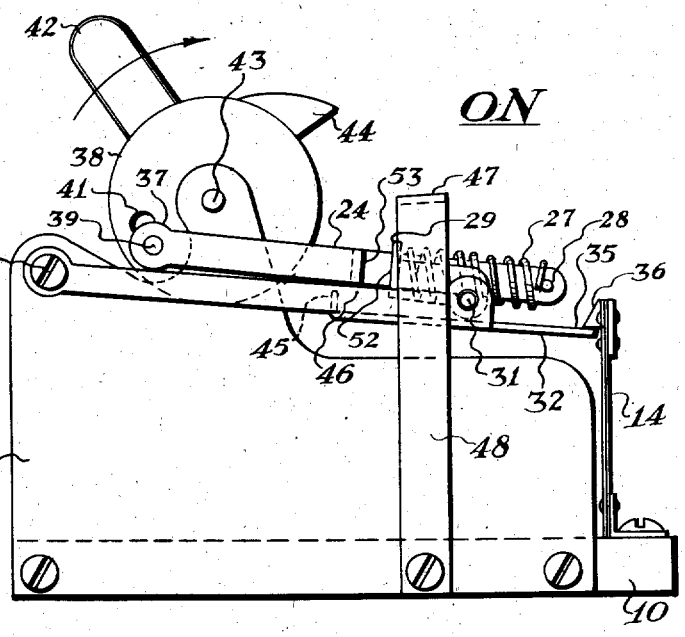

The parts just described may be operated as follows: Assume the parts to be in "on" position (Figure 2). When the handle 42 is moved to the right, the bell crank 38 rotates clockwise, carrying end 37 of link 24 along with it, thus moving links 24 and 29, together, about the pivot 31, clockwise. This action pulls link 24 to the left a slight degree and builds up an increased compression in coil springs 27.

As soon as link 24 has passed over center (shaft 43) the coil spring operates, to move links 24 and 29 further past shaft 43, with a snap action, slot 41 permitting snap action movement of links 24 and 29, independently of the handle 42,

BEST AVAILABLE COPY so that quick action may be effected independently of the operator.

Handle 42 is so connected that it may move the link 24 without the assistance of the spring 27, after having taken up the lost motion provided in slot 41. This permits the handle 42 to move the arm 24 positively to the "off" position, independently of the spring, in the event the spring should become broken or weakened too much to function of its own accord.

The bell crank 38 may be moved to the extreme "off" position as limited by the engagement of the reset lug 44 and stop 45 on pawl 32.

Reverse movement of handle 42, to the left, from the "off" position (Fig. 4) imparts a counter-clockwise movement to link 24 about pin 31. This action pulls link 24 to the left and compresses spring 27 between pin 28 and the bight of the spring compression link 29, until link 24 is past center (shaft 43).

Then the compressive force of the spring reacts, giving a rapid counter-clockwise movement to link 24.

Slot 41 permits a snap action movement of links 24 and 29, independent of the movement of handle 42, in order to effect a quick action, independent of the operator. The bell crank may be moved to the extreme "on" position, as determined by the length of slot 41, and the "on" position of link 24, as shown in Fig. 2.

The action just described is a quick action, and takes place when spring 27 functions properly. At other times, the positive connection between handle 42 and link 24, as previously described, insures action.

During the operation, travel of pawl 32, about its pivot screws 33 is prevented, by its end 35 being held by the tongue 36 of warping element 14.

It will be observed that slot 41 provides a lost motion connection between handle 42 and link 24, which permits movement of the latter, when overcenter and as influenced by spring 27, independently of the handle for accelerating the quick action of the link 24, the extent of this action being determined by the dimensions of slot 41 and the associated parts. A positive make and break action of the linkage is, however, assured by the positive (even though lost motion) connection between handle 42 and link 24.

The foregoing parts, in conjunction with other parts to be described below, move from "on" position to a second or overload "off" position, when element 14 warps to the right due to an overload in the line, and also serves to enable the operator to reset the mechanism after it had been tripped on overload, by moving the various parts, linkages, and the pawl 32 from their overload "off" position to their normal "off" position without causing link 24 to assume the position of Fig. 2, and these operations are carried on as follows:

Assume the switch to be in "on" position. When the element 14 warps (to the right) its tongue 36 releases pawl end 35, permitting the compression in spring 27 to tend to move link 29, and consequently pin 31, to the left. Since link 29 is fixed to pawl 32 at 31, the movement of pin 31 to the left is on an arc whose center is pivot 33, and is necessarily accompanied by an upward movement of pin 31. The parts move up and their inertia carries them to the point where pawl 32 is engaged by the hooked ledge 47 on stop 48. By this time, the line of action of spring 27, thru a line connecting pivot 39 and pin 28, is above center 43, and the spring therefore causes drum 38 to rotate clockwise, to pull the left end of link 24 clockwise, and upwardly to the position shown in Figure 5, known as "overload off." Quick action is of course assured by the action of spring 27.

In view of the fact that this action can take place without interference from handle 42, due to the fact that the pivot 39 need not move any great extent on this action, the mechanism cannot be prevented from tripping, merely by holding handle 42. In other words, the mechanism will trip even though the handle be held. This characteristic places the mechanism in the trip-free class.

When the parts are to be reset, that is to say, to be moved from "overload off" (Fig. 5) to switch "off" (Fig. 4), handle 42 is moved to the right, rotating bell crank 38 clockwise until the lower edge of elongated slot 41 comes in contact with pin 39 carrying it past center (shaft 43). The spring 27 then continues the clockwise movement of pin 39 pivoting link 24 about pin 31 until shoulder 52 on spring compression link 29 engages shoulder 53 on link 24.

A continued movement of the handle to the right causes the stop lug 44 on bell crank 38 to engage stop 45 on pawl 32, rotating the latter clockwise about screws 33 until its end 35 snaps under tongue 36 of warping element 14, resetting the parts to the "off" position of Figure 4.

By properly proportioning and connecting the parts, the action may be such that during movement of the handle 42, lug 44 can be resetting link 32 to its normal latched position, during the time that link 24 is moving overcenter to the "off" position.

It will be observed at this time that the mechanism described in the foregoing possesses certain novel and desirable characteristics. It is trip-free; it operates with a quick action, both on normal switch operations, and on overload; it insures positive action, in addition to and without interfering with the quick action; and it can be reset after tripping, with a snap action.

In addition, in the event the spring 27 breaks, it will not fall into live parts with consequent damage, but will remain upon the link 24 upon which it is mounted, being held between pin 28 and link 29.

Further, since the spring 27 does not have to be flexed to any great extent, due to the tangential relation of the link 27 and the drum 38, the life of the spring is relatively prolonged.

Further, it is to be noted that this mechanism employs only one spring for all its operations, this spring serving to perform the functions of quick action under normal switching, and quick action under overload tripping.

Further, since the spring 27 connects the operating link 24 and the pawl, it is free of the handle, and therefore does not interfere with positive action of the handle, as contra-distinguished from constructions wherein the spring connects the operating link or part to the handle.

Now having described one form of mechanism, reference will be had to the following claims which determine the scope of the invention, it being expressly understood that the mechanism heretofore described and disclosed has been chosen merely as an example, and not as illustrating all of the possible embodiments of the invention.

I claim:

1. A circuit breaker operating mechanism including an elongated pawl fixedly pivoted at one

BEST AVAILABLE COP' end to a fixed part, and normally held down at the other end by an overload release part, an operating crank fixedly pivoted to a fixed part and having a reset part for engaging said pawl and resetting it by moving it downwardly after it has been released by said release part and moved upwardly, an operating link connected at one end to said crank by a positive, lost-motion pivotal connection and positioned alongside said pawl, with its aforesaid pivotal connection adjacent the pivotal connection of the pawl, a compression spring on the end of said operating link adjacent the release part, and a spring compression link pivotally connected to the operating link and to the pawl.

2. A circuit breaker operating mechanism including an elongated pawl fixedly pivoted at one end to a fixed part, and normally held down at the other end by an overload release part, an operating crank fixedly pivoted to a fixed part and having a reset part for engaging said pawl and resetting it by moving it downwardly after it has been released by said release part and moved upwardly, an operating link connected at one end to said crank by a positive, lost motion pivotal connection and positioned alongside said pawl, with its aforesaid pivotal connection adjacent the pivotal connection of the pawl, a compression spring on the end of said operating link adjacent the release part, and a spring compression link pivotally connected to the operating link and to the pawl, the spring providing a quick movement for the operating link.

3. A circuit breaker operating mechanism including an elongated pawl fixedly pivoted at one end to a fixed part, and normally held down at the other end by an overload release part, an operating crank fixedly pivoted to a fixed part and having a reset part for engaging said pawl and resetting it by moving it downwardly after it has been released by said release part and moved upwardly, an operating link connected at one end to said crank by a positive, lost motion pivotal connection and positioned alongside said pawl, with its aforesaid pivotal connection adjacent the pivotal connection of the pawl, a compression spring on the end of said operating link adjacent the release part, and a spring compression link pivotally connected to the operating link and to the pawl, the aforesaid links moving about the connection between the spring compression link and the pawl, as a pivot, with the pawl at rest, during manual operation.

4. A circuit breaker operating mechanism including an elongated pawl fixedly pivoted at one end to a fixed part, and normally held down at the other end by an overload release part, an operating crank fixedly pivoted to a fixed part and having a reset part for engaging said pawl and resetting it by moving it downwardly after it has been released by said release part and moved upwardly, an operating link connected at one end to said crank by a positive, lost motion pivotal connection and positioned alongside said pawl, with its aforesaid pivotal connection adjacent the pivotal connections of the pawl, a compression spring on the end of said operating link adjacent the release part, and a spring compression link pivotally connected to the operating link and to the pawl, the link moving about the connection between the spring compression link and the pawl, as a pivot, with the pawl at rest, during manual operation, the spring providing a quick movement for the operating link.

5. A circuit breaker operating mechanism including an elongated pawl fixedly pivoted at one end to a fixed part, and normally held down at the other end by an overload release part, an operating crank fixedly pivoted to a fixed part and having a reset part for engaging said pawl and resetting it by moving it downwardly after it has been released by said release part and moved upwardly, an operating link connected at one end to said crank by a positive, lost motion pivotal connection and positioned alongside said pawl, with its aforesaid pivotal connection adjacent the pivotal connection of the pawl, a compression spring on the end of said operating link adjacent the release part, and a spring compression link pivotally connected to the operating link and to the pawl, the operating link and the pawl together moving about their adjacent pivotal connections as pivots, on overload release movement.

6. A circuit breaker operating mechanism including an elongated pawl fixedly pivoted at one end to a fixed part, and normally held down at the other end by an overload release part, an operating crank fixedly pivoted to a fixed part and having a reset part for engaging said pawl and resetting it by moving it downwardly after it has been released by said release part and moved upwardly, an operating link connected at one end to said crank by a positive, lost motion pivotal connection and positioned alongside said pawl, with its aforesaid pivotal connection adjacent the pivotal connection of the pawl, a compression spring on the end of said operating link adjacent the release part, and a spring compression link pivotally connected to the operating link and to the pawl, the operating link and the pawl together moving about their adjacent pivotal connections as pivots on overload release movement, the spring providing a quick movement for the operating link.

7. A circuit breaker operating mechanism including an elongated pawl fixedly pivoted at one end to a fixed part, and normally held down at the other end by an overload release part, an operating crank fixedly pivoted to a fixed part and having a reset part for engaging said pawl and resetting it by moving it downwardly after it has been released by said release part and moved upwardly, an operating link connected at one end to said crank by a positive, lost motion pivotal connection and positioned alongside said pawl, with its aforesaid pivotal connection adjacent the pivotal connection of the pawl, a compression spring on the end of said operating link adjacent the release part, and a spring compression link pivotally connected to the operating link and to the pawl, the links moving about the connection between the spring compression link and the pawl, as a pivot, with the pawl at rest, during manual operation, the operating link and the pawl together moving about their adjacent pivotal connections as pivots, on overload release movement.

8. For use with a contact to which it may be operatively connected so as to form a circuit breaker controlling mechanism, a resilient mechanism, a movable current responsive latch so constructed and arranged that it normally engages the mechanism for holding it, the parts being so arranged relatively that the mechanism, when held by the latch, is under longitudinal stress, the latch being movable on a circuit abnormality for releasing the mechanism, a rotatably mounted handle, means operatively connecting it to the mechanism, the handle being so constructed and arranged that on rotary movement thereof out of its

BEST AVAILABLE COP' normal position it will stress the mechanism longitudinally and move it bodily out of its normal position and towards the center of rotation of the handle so that when the handle is released after such movement the mechanism will tend to relieve itself of the longitudinal stress created therein by such movement of the handle with a snap action, the parts being so arranged relatively that on such stress relieving movement of the mechanism following such handle movement and subsequent release, the mechanism will move bodily beyond the center of rotation of the handle and about the connection between the mechanism and latch as a pivot, and also being so arranged relatively that on release of the latch, when the handle and mechanism are in normal position, the mechanism will tend to relieve itself of the stress that it possesses when it is held by the latch with a snap action and in so doing will move bodily about its connection to the handle as a pivot.

9. A construction of the character described in claim 8, wherein the handle is so arranged relatively to the mechanism that it may be manipulated to reset the mechanism into normal position and held by the latch under stress, following movement thereof responsive to release of the latch, by movement of the handle in a manner generally similar to the movement thereof that causes movement of the mechanism out of normal latch held position.

10. A construction of the character described in claim 8 wherein the points of connection between the handle and mechanism and between the latch and mechanism are spaced from each other.

ALFRED J. THOMSON.